Dec. 15, 1925.
J. FRAME
1,565,268
MACHINE FOR REMOVING BURS AND OTHER ENTANGLED SUBSTANCES
FROM SKINS AND PELTS
Filed April 30, 1923
2 Sheets-Sheet 1
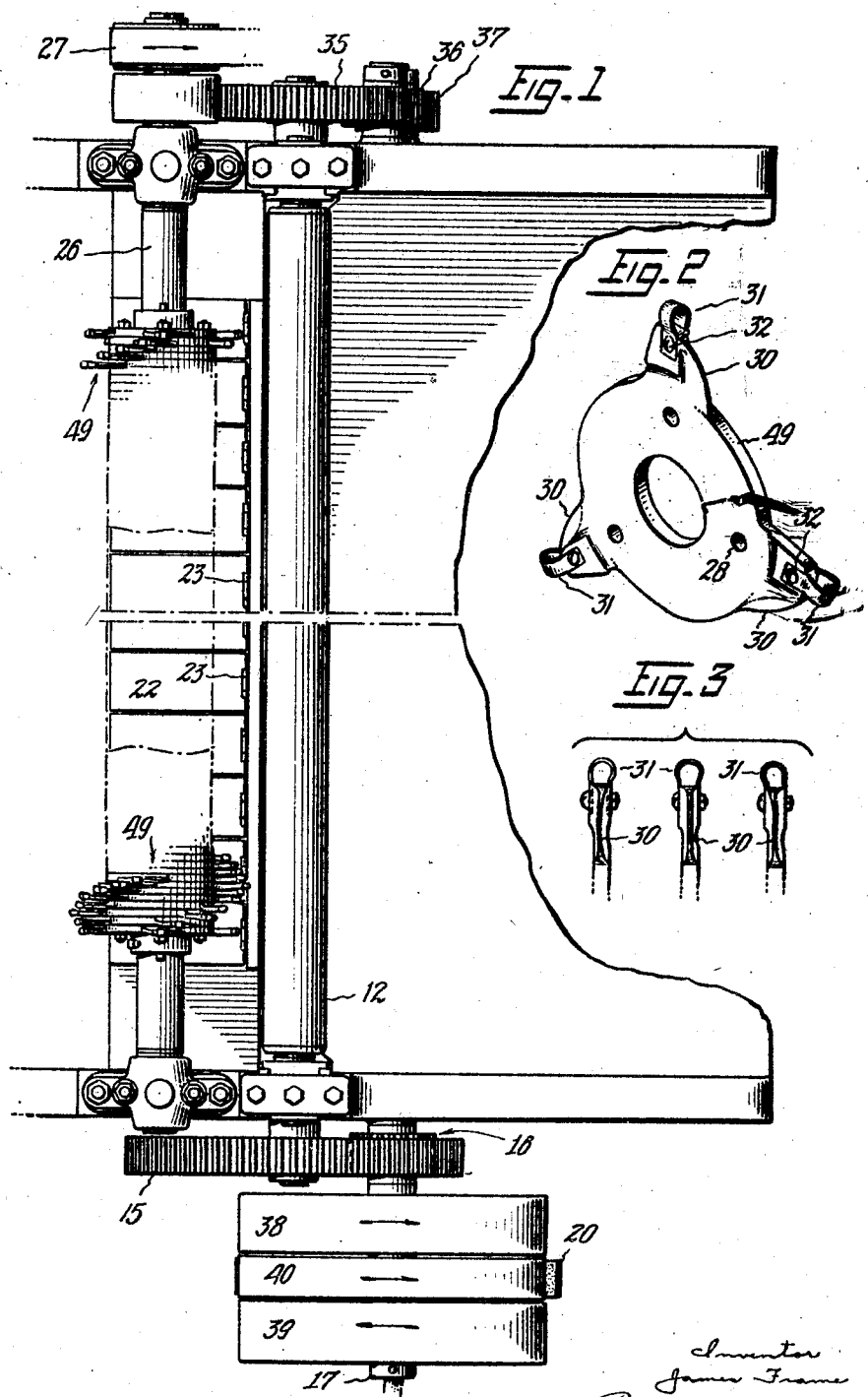

Dec. 15, 1925.                                                         1,565,268
J. FRAME
MACHINE FOR REMOVING BURS AND OTHER ENTANGLED SUBSTANCES
FROM SKINS AND PELTS
Filed April 30, 1923           2 Sheets-Sheet 2

Patented Dec. 15, 1925.

1,565,268

UNITED STATES PATENT OFFICE.

JAMES FRAME, OF KOGARAH, NEAR SYDNEY, NEW SOUTH WALES, AUSTRALIA.

MACHINE FOR REMOVING BURS AND OTHER ENTANGLED SUBSTANCES FROM SKINS AND PELTS.

Application filed April 30, 1923. Serial No. 635,438.

*To all whom it may concern:*

Be it known that I, JAMES FRAME, subject of the King of Great Britain and Ireland, residing at 5 Gladstone Street, Kogarah, near Sydney, in the county of Cumberland and State of New South Wales, Australia, have invented certain new and useful Improvements in Machines for Removing Burs and Other Entangled Substances from Skins and Pelts, of which the following is a specification.

This invention relates to the removal of burs, seeds and other entangled vegetable matter from wool on dry skins or pelts.

It consists in a machine in which the removal of burs is effected by the action of dividers and beaters carried on the periphery of a rotating drum. The skins or pelts are presented to the dividers and beaters by traversing the skin or pelt below the drum so that the dividers and beaters may rapidly strike the wool, the dividers parting it and the beaters mechanically beating out the burs without substantially affecting the integrity of the fibres. The dividers and beaters are disposed in helical order about the drum surface so that an overlap action of the beaters successively striking through it is obtained, ensuring parting of the entire surface in close parallel lines and effective beating of the burs which are exposed centrally in and at either side of each parting.

In the accompanying drawings,—

Fig. 1 is a top plan view of the machine,

Fig. 2 is a perspective view of a disc element carrying three dividers and beaters. The drum is built up of an assembly of a large number of such disc like elements fixed axially together and arranged in relative rotational order, so that the dividers and beaters will be located in helical arrangement around the peripheral surface of the drum. The three dividers and beaters on each of the discs are respectively arranged in mid position and offset to right and left of mid position. This arrangement is shown in the fragmentary elevational view Fig. 3;

Figure 4:
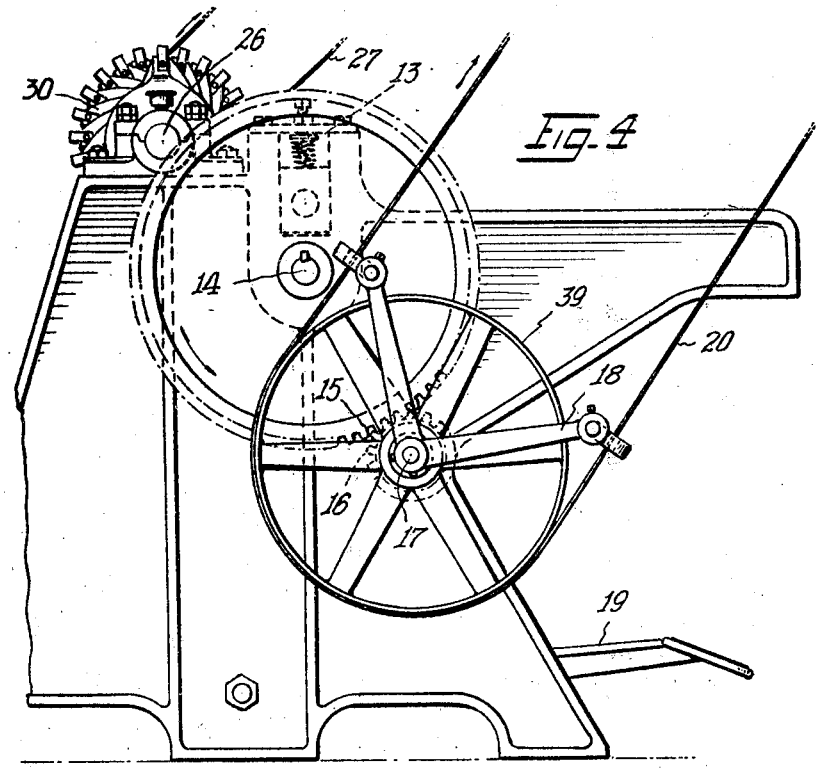
Fig. 4 is a side elevational view of the machine.
Figure 5:
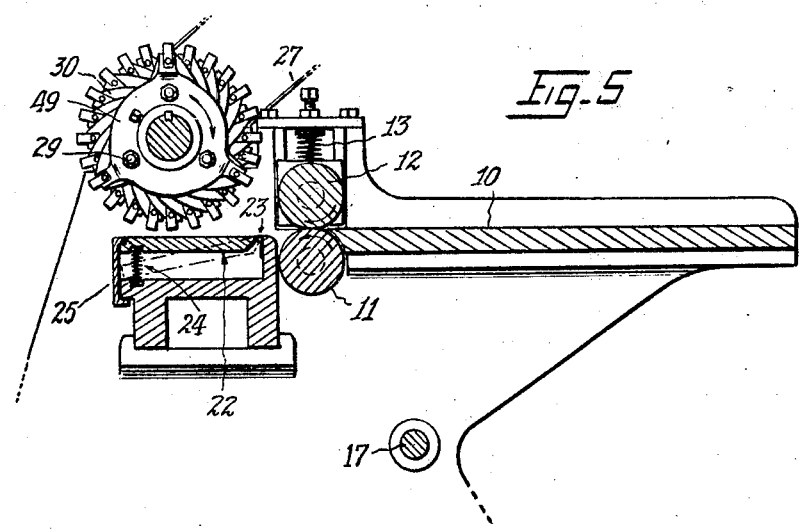
Fig. 5 is a fragmentary longitudinal section.

10 is a fixed table on which pelts or skins are handled by the operator. Feed rolls are fitted at the back end of this table; 11 is the drive roll, and 12 an idle roll. These rolls are three inches or more in diameter. The idle roll 12 is carried in slide bearings fitted with loading springs 13 which are arranged to force the idle roll 12 towards the drive roll 11. The drive roll spindle 14 carries gear wheels 15 and 35 on its respective ends, which are driven, the one by a pinion 16 on a belt shaft 17, and the other through the wheel train 36, 37. The pinion 16 is free on the shaft 17, but is fixed to the belt pulley 38. The pinion 37 and the belt pulley 39 are fixed to the shaft 17. The intermediate idle belt pulley 40 runs free on the shaft 17. A belt striking gear 18 operated by linkage from a pedal 19 controls a belt 20 to drive the roll 11 either right-hand or left-hand as required. The form and arrangement of the striker gear and the roll drive are immaterial; any mechanical arrangement offering convenient control to the workman may be substituted for that shown, so long as it be effective for rapidly reversing the direction of movement of the feed rolls 11—12 during the deburring operation. These rolls in operation are turned at the rate of about twelve rotations per minute.

Rearward of the feed rolls 11—12 is a work table constituted of an assembly of slats or flaps 22, each hinge-mounted as shown at 23, and each individually supported below by a spring 24 and restrained against upward movement beyond the desired level by a check or bridle 25. The work table constituted of the assembly of spring supported slats 22 is located immediately below the beater drum which is carried on a heavy spindle 26. Said spindle is driven by a belt 27 at 600 to 800 rotations per minute. The drum is built up of a large number of disc sections (Fig. 2) which are drilled as shown at 28 to take through bolts 29 which lock the assembly together. Each disc 49 (Fig. 2) carries three peripheral lugs, the leading portions of which are tapered to blunt edges to form curved parting blades 30. At its apex each of these lugs also carries a beater 31 which may be conveniently constituted of a blade of sheet steel bent to loop shape and secured by rivets or by bolts 32, which facilitate refitting when the beater is worn. Two of the respective parting blades 30 on each disc 49 are offset to right and to left respectively, and one of them is at centre. The beaters respectively attached to them are similarly offset. This arrangement is clearly seen at Fig. 3. As the beater lines overlap, every portion of the wool is dealt with and no lines or areas on the skin or pelt are missed by the beater action.

It has been found most advantageous to make the beaters tubiform, which is done most conveniently in the construction shown. But instead of making the beaters tubiform, they may be made with their rear ends closed so that they form cups. Quite satisfactory deburring is effected with solid beaters which are formed with deeply concaved faces. Less satisfactory work is done if the beaters be formed as solid flat faced knuckles. In all cases the beaters are preceded in the direction of their revolution by an opener, which is best constituted of the blade like forward extension 30 of the lugs on which the beaters are mounted; it is thus ensured that the beaters will enter the wool and engage the entangled burs with certainty and will not merely act against the top of the wool.

In operation, the workman places a pelt or skin on the table 10 spreading it out with the flesh side downward, and operates the striking gear to move the feed rolls to carry the skin or pelt forward, at the same time bringing its forward edge to contact with the rolls. The rolls engage it and traverse it forwardly over the work table 22, where the dividers and beaters come in contact with it parting the wool and striking into the parting. The beaters tear out and eject the burs and throw out dust without tearing the fibre. The dust may be collected in a hood from which it may be drawn off by air suction in the manner well known in connection with wood working machinery and the like.

When the skin or pelt has traversed through but not far enough to be lost by the rolls 11—12, the feed drive is reversed so that the skin or pelt is traversed back; in the backward movement it suffers another parting and beating. Then it is reversed end for end, and the operation repeated.

If found necessary it may be subjected to two or more double beatings in either direction, and its angular position may be changed for each successive beating. The beaters do not strike the surface of the skin or pelt or injure it, as there is sufficient clearance left between the table 22 and the beaters to accommodate the skin or pelt. Where a fold or thickness is encountered, the table sections 22 depress their springs 24 to allow the necessary working clearance.

What I claim as my invention and desire to secure by Letters Patent is:—

1. An apparatus for deburring wool on skins or pelts comprising a fixed worktable, means for traversing the skins or pelts over said worktable and under a rotating drum, an assembly of dividing blades and beaters arranged in helical order on said drum and structurally arranged to part the mass of wool and strike through the partings, and an assembly of hinge-mounted, spring-supported flaps disposed beneath the beaters, said flaps constituting a yielding table for supporting the skins or pelts under the action of the beaters.

2. Apparatus according to claim 1 wherein the drum is constructed of an assemby of discs each of which carries a plurality of peripheral lugs tapered towards their leading edges to form divider blades, and rearward and above each said lug a hollow faced beater, said blades and beaters on each such disc being respectively set out of alignment with each other and the complete assembly arranged in helical order on the drum periphery.

In testimony whereof I affix my signature.

JAMES FRAME.